US012572699B2

(12) United States Patent
Li et al.

(10) Patent No.: US 12,572,699 B2
(45) Date of Patent: Mar. 10, 2026

(54) USING MEMORY PROTECTION DATA

(71) Applicant: Google LLC, Mountain View, CA (US)

(72) Inventors: Yanru Li, San Diego, CA (US); Deepti Vijayalakshmi Sriramagiri, San Jose, CA (US)

(73) Assignee: Google LLC, Mountain View, CA (US)

( * ) Notice: Subject to any disclaimer, the term of this patent is extended or adjusted under 35 U.S.C. 154(b) by 158 days.

(21) Appl. No.: 18/546,402

(22) PCT Filed: Feb. 16, 2021

(86) PCT No.: PCT/US2021/018231
§ 371 (c)(1),
(2) Date: Aug. 14, 2023

(87) PCT Pub. No.: WO2022/177549
PCT Pub. Date: Aug. 25, 2022

(65) Prior Publication Data
US 2024/0135042 A1    Apr. 25, 2024
US 2024/0232438 A9    Jul. 11, 2024

(51) Int. Cl.
*G06F 21/64*          (2013.01)

(52) U.S. Cl.
CPC ................................... *G06F 21/64* (2013.01)

(58) Field of Classification Search
CPC ........ G06F 21/64; G06F 21/53; G06F 21/554; G06F 2212/1052; G06F 11/1068; G06F 12/109; G06F 12/1483
See application file for complete search history.

(56) References Cited

U.S. PATENT DOCUMENTS

| 6,901,551 B1 | 5/2005 | Corrigan |
| 9,442,941 B1 | 9/2016 | Luz et al. |
| 9,753,858 B2 | 9/2017 | Loh et al. |
| (Continued) | | |

FOREIGN PATENT DOCUMENTS

| JP | 3078946 B2 | 8/2000 |
| JP | 2011118504 A | 6/2011 |
| (Continued) | | |

OTHER PUBLICATIONS

"Foreign Office Action", EP Application No. 21711663.1, Feb. 23, 2024, 6 pages.

(Continued)

*Primary Examiner* — Khalid M Almaghayreh
(74) *Attorney, Agent, or Firm* — Colby Nipper PLLC

(57) ABSTRACT

The present disclosure describes techniques and apparatuses that are directed to using memory protection data within a computing device. Techniques include allocating regions of a memory for storing application data and protection data. Techniques also include creating a bitmap having bit values corresponding to memory blocks within the allocated regions. The one or more bit values can be indicative of whether application data and/or protection data are present in a memory block. The techniques and apparatuses can enable memory protection, such as memory security (e.g., encryption) and memory safety (e.g., error correction code (ECC) usage), to be efficiently used while permitting discontiguous memory allocations and without substantial operating system modification.

20 Claims, 6 Drawing Sheets

(56) References Cited

U.S. PATENT DOCUMENTS

| | | | |
|---|---|---|---|
| 11,088,845 B2 * | 8/2021 | Sela | G06F 21/79 |
| 2008/0320254 A1 | 12/2008 | Wingard et al. | |
| 2011/0078544 A1 * | 3/2011 | Gruner | G06F 11/1048 |
| | | | 714/E11.035 |
| 2011/0154059 A1 * | 6/2011 | Durham | G06F 21/79 |
| | | | 711/163 |
| 2013/0262958 A1 * | 10/2013 | Ruggiero | G06F 11/1048 |
| | | | 714/763 |
| 2013/0339643 A1 * | 12/2013 | Tekade | G06F 16/128 |
| | | | 711/162 |
| 2015/0161059 A1 * | 6/2015 | Durham | G06F 12/0897 |
| | | | 713/193 |
| 2018/0032394 A1 | 2/2018 | Quach et al. | |
| 2018/0314586 A1 * | 11/2018 | Artieri | H04L 1/0057 |
| 2019/0006001 A1 * | 1/2019 | Chun | G06F 11/073 |
| 2019/0056990 A1 * | 2/2019 | Suh | G06F 3/068 |
| 2019/0340066 A1 | 11/2019 | Radke et al. | |
| 2021/0374294 A1 * | 12/2021 | Chiu | G06F 21/64 |
| 2022/0187997 A1 * | 6/2022 | Chu | G06F 21/44 |
| 2022/0222137 A1 * | 7/2022 | Li | G06F 16/907 |
| 2023/0132695 A1 * | 5/2023 | Parker | G06F 12/1009 |
| | | | 711/163 |

FOREIGN PATENT DOCUMENTS

| | | |
|---|---|---|
| JP | 5426711 B2 | 12/2013 |
| KR | 20130131025 | 12/2013 |
| WO | 2022177549 | 8/2022 |

OTHER PUBLICATIONS

"International Preliminary Report on Patentability", Application No. PCT/US2021/018231, Aug. 22, 2023, 7 pages.

"International Search Report and Written Opinion", Application No. PCT/US2021/018231, Dec. 14, 2021, 15 pages.

"Foreign Office Action", JP Application No. 2023-548590, Aug. 27, 2024, 3 pages.

"Foreign Office Action", KR Application No. 10-2023-7028522, Sep. 18, 2025, 21 pages.

* cited by examiner

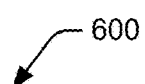

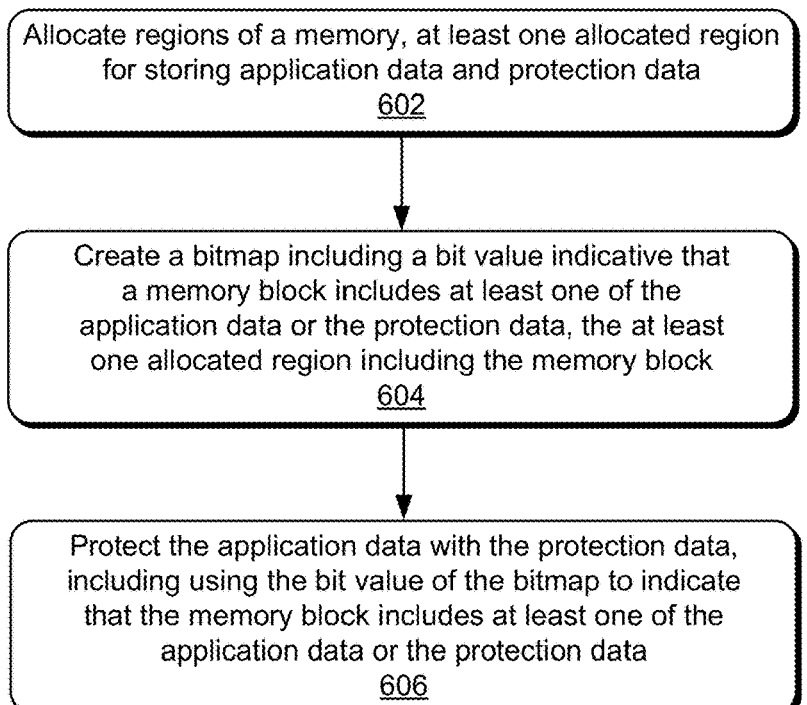

Allocate regions of a memory, at least one allocated region
for storing application data and protection data
602

Create a bitmap including a bit value indicative that
a memory block includes at least one of the
application data or the protection data, the at least
one allocated region including the memory block
604

Protect the application data with the protection data,
including using the bit value of the bitmap to indicate
that the memory block includes at least one of the
application data or the protection data
606

Fig. 6

USING MEMORY PROTECTION DATA

RELATED APPLICATION(S)

This application is a national stage entry of International Application No. PCT/US2021/018231, filed Feb. 16, 2021, the disclosure of which is incorporated herein by reference in its entirety.

BACKGROUND

Security and functional safety are important design considerations for a computing device. The design of the computing device can improve security using, for example, hardware executing data encryption, hashing, or anti-rollback counter (ARC) algorithms. Similarly, the design of the computing device may use hardware executing error correction code (ECC) algorithms to improve functional safety. Memory protection techniques may, in general, use protection data to ensure the integrity of application data that is stored in memory and is accessible by hardware of the computing device.

Existing memory protection techniques may impact overhead in terms of a capacity of a memory and/or a transaction bandwidth with the memory of the computing device. For example, two bytes for storing a hash digest of memory contents may be consumed for every 64 bytes of application data that a hashing algorithm is tasked with verifying. Similarly, two bytes for storing an ECC syndrome of memory contents may be consumed for every 64 bytes of application data that an ECC algorithm is tasked with checking and/or correcting. In general, a size ratio of application data to protection data may be dependent on a desired strength of protection.

In some instances, a design of a computing device may require increasing allocations of a total capacity of a memory by up to 20% to employ protection data such as a hash digest and/or ECC syndrome data. It can therefore be challenging to incorporate protection data into a computing device without appreciably impacting memory performance.

This background is provided to generally present the context of the disclosure. Unless otherwise indicated herein, material described in this section is neither expressly nor impliedly admitted to be prior art to the present disclosure or the appended claims.

SUMMARY

The present disclosure describes techniques and apparatuses for using memory protection data within a computing device. Described techniques include allocating regions of a memory for storing application data and protection data. Such techniques also include creating a bitmap that is indicative of whether memory blocks within the allocated regions include the application data and/or the protection data. The techniques and apparatuses can reduce memory overhead by decreasing memory consumption and/or simplifying memory transactions within the computing device.

In some aspects, a method performed by a computing device is described. The method includes allocating regions of a memory for storing application data and protection data and creating a bitmap that includes a bit value indicative that a memory block includes at least one of the application data or the protection data. The method also includes protecting the application data with the protection data, wherein the protecting includes using the bit value to indicate that the memory block includes at least one of the application data or the protection data.

In other aspects, a computing device is described. The computing device includes a memory, a central processing unit (CPU), a protection engine, and a computer-readable storage medium (CRM). The CRM includes one or more modules of executable code that, upon execution by the CPU, direct the computing device to perform multiple operations. The operations include computing an amount of the memory for storing application data and protection data and allocating one or more regions of the memory to provide the computed amount. The operations also include creating a bitmap of at least a portion of the memory that includes bit values indicative that one or more memory blocks of the allocated regions include at least one of the application data or the protection data. The operations further include provisioning the bitmap to the protection engine.

The details of one or more implementations are set forth in the accompanying drawings and the following description. Other features and advantages will be apparent from the description, the drawings, and the claims. Thus, this Summary is provided to introduce subject matter that is further described in the Detailed Description. Accordingly, a reader should not consider the Summary to describe essential features nor threshold the scope of the claimed subject matter.

BRIEF DESCRIPTION OF THE DRAWINGS

Apparatuses and techniques that use memory protection data, including application data and protection data for protecting the application data, are described with reference to the following drawings. The same numbers are used throughout the drawings to reference like features and components:

FIG. 6 illustrates an example method using memory protection data techniques in accordance with one or more aspects.

DETAILED DESCRIPTION

Overview

Figure 1:
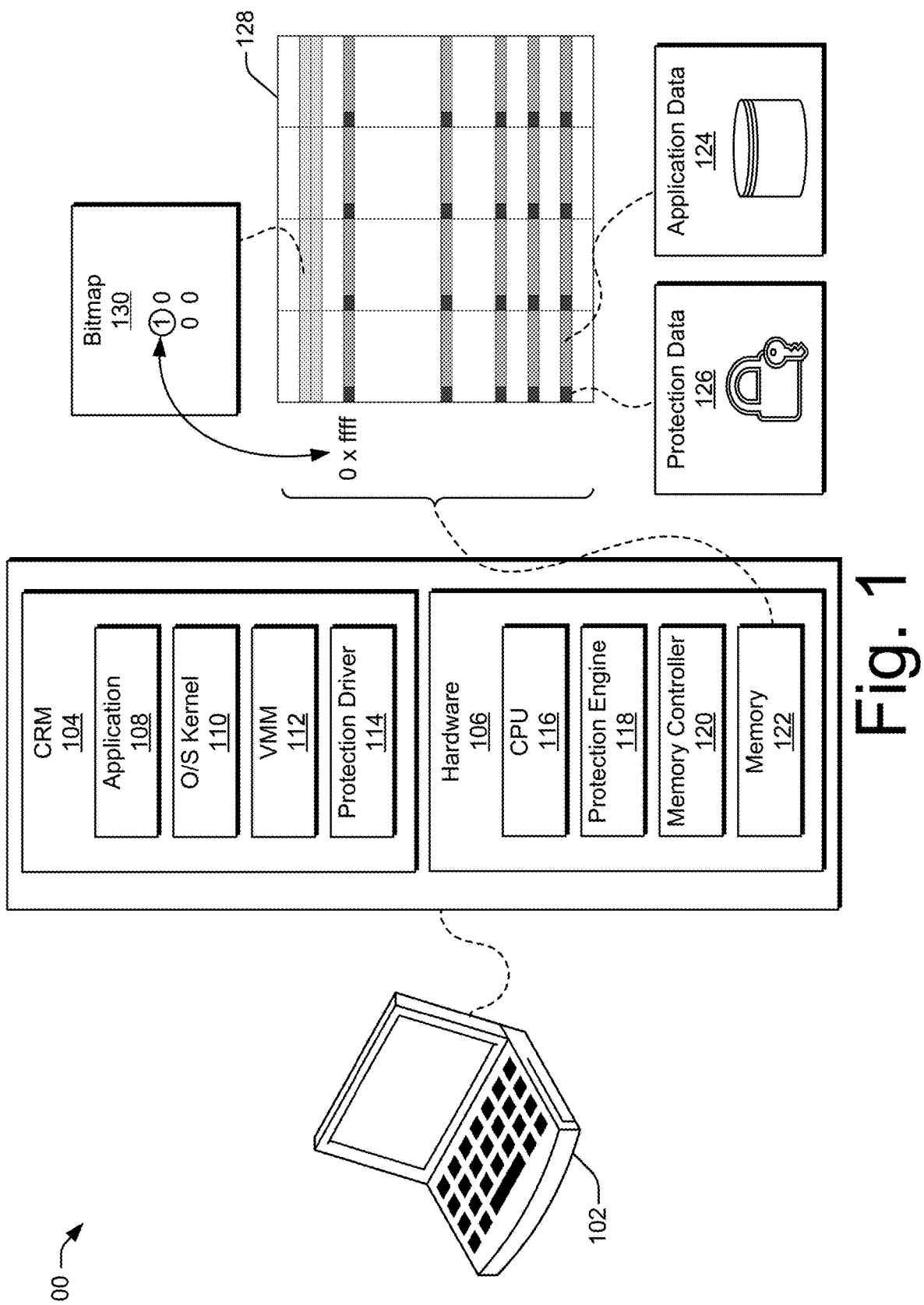
FIG. 1 illustrates an example operating environment including a computing device using memory protection data in accordance with one or more aspects.

The present disclosure describes techniques and apparatuses that are directed to using memory protection data within a computing device. Described techniques include allocating regions of a memory for storing application data and protection data and creating a bitmap. The bitmap is indicative of which memory blocks within the allocated regions include the application data and/or the protection data. The techniques and apparatuses may reduce memory overhead by decreasing memory consumption and/or simplifying memory transactions within the computing device.

Security and functional safety of a computing device often rely on the integrity of data supporting an application executed by a CPU of the computing device. Applications that may have security and/or functional safety needs include, for example, a banking application, an email application, an automotive control application (e.g., that controls a braking system), and so on. The data supporting the application is generally stored in a memory of the computing device, which in turn may be compromised through mechanisms that include malicious hacking, soft errors, and failure due to wear and tear.

There are existing memory protection strategies that can increase the integrity of the data and are effective to improve security and/or functional safety of the application being executed by the computing device. For example, hardware of the computing device may execute data encryption, hashing, or ARC algorithms to improve data security. Similarly, the hardware of the computing device may execute ECC algorithms to improve functional safety of the data. These algorithms, in general, use protection data to ensure the integrity of application data.

There are also existing techniques for employing protection data with a memory system. Each of these existing techniques, however, has one or more drawbacks that adversely impact computing device performance. A first drawback of existing techniques for using protection data involves introducing additional overhead in terms of a capacity of a memory of the computing device. For example, a technique can entail carving out substantial contiguous memory regions for application data that is to be protected and for the protection data. The large contiguous memory regions cause the memory to be inefficiently used as the operating system of the computing device cannot adequately share the memory among many applications. In an instance of allocating contiguous memory for protection data that may include a hash digest data, ECC syndrome data, and application data, existing contiguous techniques may allocate up to 20% of the overall memory capacity to the protection data alone.

A second drawback of existing techniques for using protection data involves those that do permit fragmented memory allocations to avoid large contiguous carve-out allocations. These techniques, however, inefficiently reserve memory and entail appreciable modifications to operating system memory management procedures. For instance, although the carve-out for the application data may be fragmented in this case, the carve-out for the protection data is oversized to cover the memory system in its entirety (thereby simplifying algorithms that may map application data and/or protection data).

The large size occurs because these techniques reserve sufficient memory to store protection data for all application data that might ultimately be present throughout the memory space, even when the actual amount of application data is likely to be significantly less during operation. The full reservation for the protection data is used by these techniques to locate the protection data for any given application data. Additionally, such techniques rely on modifying the operating system memory management procedures. These modifications include reusing bits that may be reserved in a page table entry to reflect whether application data is protected for a given page, updating the page attribute appropriately during operation, and propagating signals containing memory attributes within the computing device. These techniques, therefore, also may require a nonstandard operating system and complicate the memory management procedures.

A third drawback of existing techniques using protection data involves overhead with regards to a quantity of memory transactions within a computing device. As an example, while executing a memory protection algorithm, a protection engine of the computing device may first access the memory to retrieve ECC syndrome data and then, in a second distinct operation, access the memory to retrieve application data to be checked and corrected. These multiple memory accesses can lead to increases in power consumption and memory latency that both decrease computing performance.

Example implementations in various levels of detail are discussed below with reference to the associated figures. The example implementations include (i) a method that creates a bitmap to indicate one or more memory blocks of allocated memory regions that store application data or protection data, including memory blocks having co-located application data and protection data and (ii) a computing device having a protection engine that utilizes such a bitmap. The allocated memory regions and the memory blocks may have different sizes. For example, an allocated memory region may include multiple memory blocks, which correspond to an example granularity of the bitmap. Alternatively, allocated memory regions and memory blocks may have a common size, such as that of a memory page (e.g., 4 kilobytes (4 KB) in some systems).

In general, and in contrast to existing techniques which may pre-allocate large blocks of contiguous memory to application or protection data, use of the bitmap allows for a flexible, selectable allocation of fragmentable memory to reduce the memory capacity used when implementing memory protection. Using a bitmap may also obviate changes to a memory manager of an operating system because hardware can identify and manage which memory blocks include application data that is protected or the corresponding protection data with reference to the bitmap. This bitmap additionally enables memory allocations for the protection data to be made as protection data is used, instead of using one over-sized pre-allocation that will likely be underutilized. Furthermore, and in contrast to existing techniques that may require multiple memory accesses across large blocks of contiguous memory, using the bitmap to access memory protection data that is co-located within a given memory block of the fragmented memory can increase speed of operations and reduce power consumption. In combination, the reduction in memory capacity utilization, the ability to independently allocate memory portions for protection, the increase in speed, the reduction in power consumption, and/or the simplification of the memory management processes of the operating system separately and jointly translate into an overall reduction in memory overhead.

The discussion below first describes an example operating environment, followed by example hardware and feature details for using protection data, followed by an example method, and concludes with related example aspects. The discussion may generally apply to a region of a memory having memory blocks and to techniques associated with virtual and/or physical memory addressing. However, for clarity, consistency, and brevity, the discussion is presented in the context of pages of a memory that are accessed using a physical address space (after translation from a virtual address space as appropriate).

Example Operating Environment

FIG. 1 illustrates an example operating environment 100 including a computing device 102 using memory data protection techniques. Although illustrated as a laptop computer, the computing device 102 can be a desktop computer, a server, a wearable device, an internet-of-things (IoT) device, an entertainment device, an automated driving system (ADS) device, a home automation device, other electronic device, and so on.

The computing device 102 includes a computer-readable storage medium (CRM) 104 and hardware 106. In the context of this discussion, the CRM 104 of the computing device 102 is a hardware-based storage media, which does not include transitory signals or carrier waves. As an example, the CRM 104 may include one or more of a read-only memory (ROM), a Flash memory, a dynamic random-access memory (DRAM), a static random-access memory (SRAM), a disk drive, a magnetic medium, and so on. The CRM 104, in general, may store a collection of software and/or drivers that are executable by the hardware 106, as is described below.

The CRM 104 may store one or more modules that include executable code or instructions. For example, the CRM 104 may store an application 108, an operating system (O/S) kernel 110, a virtual machine monitor (VMM) 112, and a protection driver 114. The hardware 106 may include a CPU 116, a protection engine 118, a memory controller 120, and a memory 122. In some instances, one or more portions of the CRM 104 and one or more elements of the hardware 106 may be combined onto a single integrated-circuit (IC) device, such as a System-on-Chip (SoC) IC device. In some implementations, the CRM 104 can store a collection of drivers, OS modules, or other software that executes on the hardware 106. Thus, this software can include, for example, the application 108, the O/S kernel 110, the VMM 112, and/or the protection driver 114.

Stored within the CRM 104, the application 108 may be an application for which security and/or functional safety is desirable. Examples of the application 108 include a banking application, a payment application, an email application, an automotive control application (e.g., a braking system application), and so on.

The O/S kernel 110 may include executable code that enables elements of the hardware 106 within the computing device 102 (e.g., the CPU 116, the protection engine 118, or the memory controller 120) to transact data with the memory 122 (e.g., to read data from or to write data to the memory). Upon execution, and as part of allocating pages within the memory 122 for computing operations, the O/S kernel 110 may identify physical addresses of one or more portions of (e.g., pages within) the memory 122. Alternatively, the O/S kernel 110 may identify virtual memory addresses and permit another module or physical component (e.g., a virtual memory manager (not explicitly shown), the memory controller 120, or the protection engine 118) to compute the corresponding physical addresses.

The VMM 112, sometimes referred to as a hypervisor, may interact with one or more operating systems within the computing device 102. In some instances, the VMM 112 may include executable code to calculate an amount of the memory 122 targeted for one or more techniques that use memory protection data.

The protection driver 114 may also include executable code. The protection driver 114 may enable provisioning data to the protection engine 118, provisioning a bitmap to the protection engine 118, or other communications with the protection engine 118. Such data may include, for example, physical addresses of pages within the memory 122 that contain memory protection data, or a bitmap that corresponds to pages within the memory 122 that contain memory protection data.

The CPU 116 may include logic to execute the instructions or code of the modules of the CRM 104. The CPU 116 may include a single-core processor or a multiple-core processor composed of a variety of materials, such as silicon, polysilicon, high-K dielectric, copper, and so on. By executing one or more of the modules (e.g., the application 108, the O/S kernel 110, the VMM 112, the protection driver 114), the CPU 116 may direct the computing device 102 perform operations using memory protection data.

The protection engine 118, which may communicatively couple to the memory controller 120, may include logic to execute one or more protection algorithms (e.g., data encryption, hashing, ARC, ECC) through transacting (e.g., reading, writing) memory protection data with the memory 122.

In some instances, the protection engine 118 may include an on-chip cache. As part of memory protection data techniques, which will be described in greater detail below, the on-chip cache may be used to store a copy of a physical address of a page or a copy of a bitmap, or a copy of a portion of the bitmap. In some instances, storage operations may be dependent on a size of the on-chip cache and/or a cache line size.

The memory 122, which may be formed from an IC device, may include a type of memory such as a dynamic random-access memory (DRAM) memory, a double data-rate DRAM (DDR DRAM) memory, a Flash memory (e.g. NOR, NAND), a static random-access memory (SRAM), and so on. In some instances, the memory 122 may be part of a memory module, such as a dual in-line memory module (DIMM). In other instances, the memory 122 may be a discrete IC device or embedded on another IC device (e.g., an SoC IC device). In some implementations, the memory 122 may include at least a portion of the CRM 104. Additionally or alternatively, at least part of the code or data stored within the CRM 104 may be copied into the memory 122 for execution or manipulation by the hardware 106.

Memory protection data techniques performed by code or data, which may be at least initially stored in the CRM 104, and the hardware 106 may include allocating respective pages of the memory 122 for memory protection data (e.g., application data 124 that may be associated with the application 108 and protection data 126 that may include hash digest data, ECC syndrome data, and so on for the corresponding application data 124). In doing so, the CRM 104 and the hardware 106 may rely on a physical address space 128 that maps to physical addresses of pages within the memory 122. In some instances, and in support of the memory protection data techniques, the CRM 104 and one or more elements of the hardware 106 (e.g. one or more of the CPU 116, the protection engine 118, or the memory controller 120) may manipulate physical addresses of the memory protection data (e.g., application data 124 or protection data 126, including both) to combine the memory protection data into a same page. The manipulation may include mapping/remapping addresses, translating physical addresses into a channel, row, bank, or column of the memory 122, and so forth to adjust physical locations of data. In such instances, the manipulation may avoid memory page conflicts.

These techniques may also include allocating respective pages of the memory 122 for a bitmap 130 and updating one or more corresponding bits of the bitmap 130. The bitmap 130 may indicate the pages within the memory 122 that are allocated for storing the memory protection data (e.g., the application data 124 or the protection data 126). For example, algorithms of the VMM 112 may create the bitmap 130 by associating a bit value of "1" to physical addresses of the pages of the memory 122 that are allocated for storing the memory protection data. In a complementary fashion, algorithms of the VMM 112 may associate a bit value of "0" to physical addresses of other pages of the memory 122 that are not allocated for storing the memory protection data. Thus, at least one bit of the bitmap 130 may correspond to a memory block of the memory 122. In some cases, the memory block may have a same size as a page of the memory.

The memory protection engine 118 may receive a memory transaction command for the application data 124 that includes a system view of a physical address of a page of the memory 122. The protection engine 118 may then convert the physical address to a manipulated physical address that offsets the physical address of the application data 124 with an amount needed for the protection data 126. Using the bitmap 130, the protection engine 118 may determine that the page stores memory protection data (e.g., one or more of the application data 124 and/or the protection data 126) and perform the memory transaction command with the page based on the determination. The bitmap 130 may, however, instead map the system view of the physical addresses of pages to be indicative of whether the page stores memory protection data (e.g., the application data 124 and/or the protection data 126).

Figure 2:
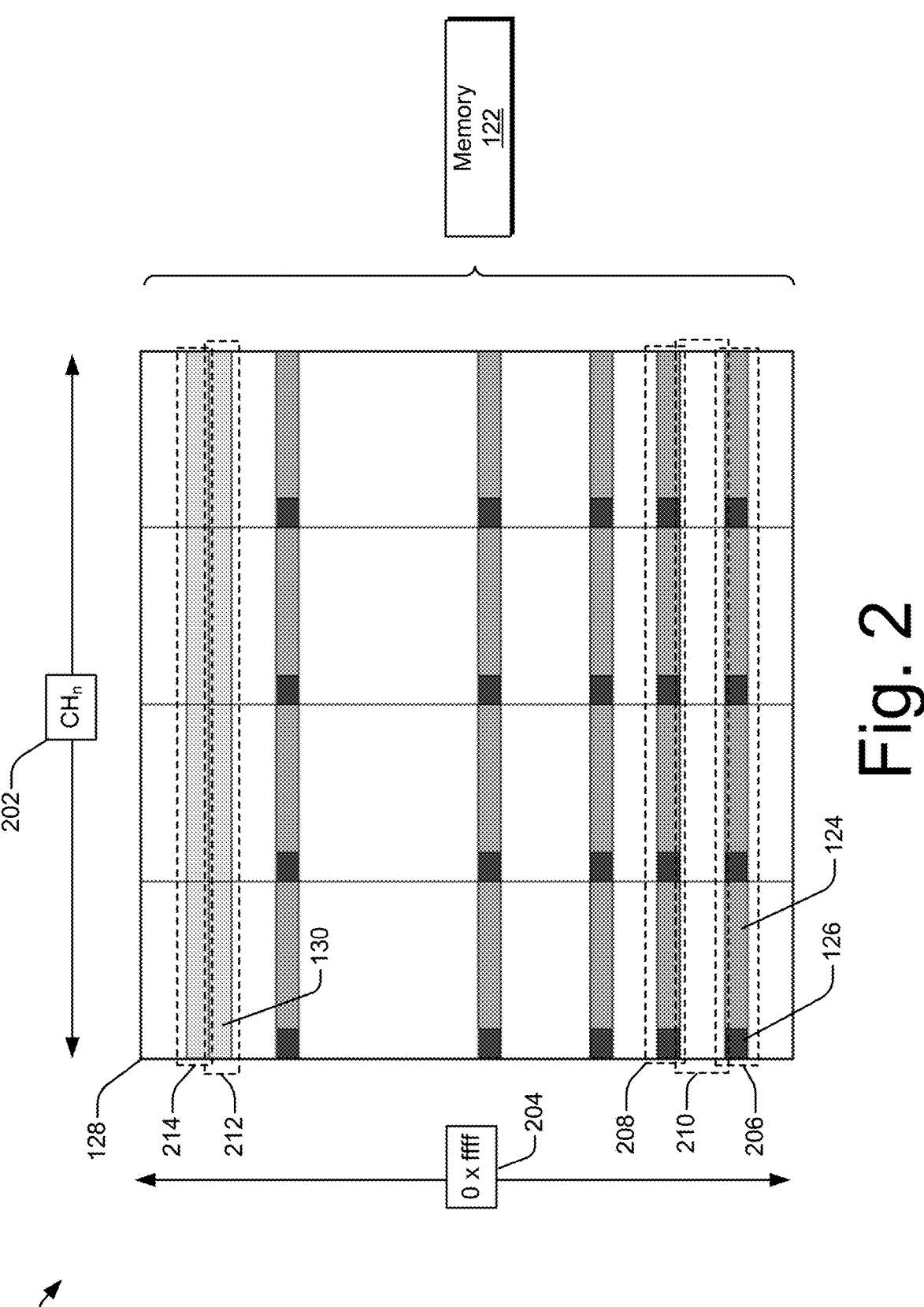
FIG. 2 illustrates example details of a physical address space that represents a memory in accordance with one or more aspects.

Memory protection data techniques using the application data 124, the protection data 126, and the bitmap 130, as described in greater detail below, may reduce memory overhead realized as the computing device 102 performs functions that ensure security and/or functional safety of the application data 124. This reduction in memory overhead can improve overall efficiency of the computing device 102, e.g., in terms of a more efficient use of the memory 122 as well as an increase in overall speed of computations.
Example Hardware and Feature Details FIG. 2 illustrates example details 200 of a physical address space that represents a memory in accordance with one or more aspects. The physical address space may correspond to the physical address space 128 that maps physical locations of pages within the memory 122 of FIG. 1. FIG. 2 also illustrates that the application data 124 and the protection data 126 may be co-located (e.g., using "mixed mapping") within one or more pages that are fragmented within the memory 122. In accordance with the example details 200 of FIG. 2, memory protection data techniques may use less of the memory 122 and require fewer transactions, thereby effectuating a reduction in memory overhead, and avoiding necessitating changes to an operating system's memory management procedures.

In general, an architecture of the memory 122 may include one or more channel(s) 202. Furthermore, a page within the memory 122 may be identified using a physical address 204 of the physical address space 128. Elements of the computing device 102 of FIG. 1 (e.g., elements of the CRM 104 and the hardware 106) may allocate regions (e.g., data ranges such as pages) of the memory 122 to store memory protection data (e.g., the application data 124 and/or the protection data 126) using physical address(es) 204 of the physical address space 128.

Memory protection data techniques may use pages that are fragmented (e.g., not contiguous) within the memory 122. For example, and as illustrated in FIG. 2, a page 206 and a page 208 may each accommodate a different permutation of the application data 124 and the protection data 126. However, as illustrated, the page 206 and the page 208 are separated by a page 210 and, as such, are fragmented.

Memory protection data techniques may also co-locate portions of the application data 124 and the protection data 126 within one or more pages of the memory 122. Furthermore, transactions associated with co-locating the application data 124 and the protection data 126 may include interleaving across multiple memory blocks (e.g., pages) and/or one or more channels 202 of the memory 122. Application data 124 and protection data 126 may further be interleaved so that application data 124 and corresponding protection data 126 may be co-located within a same bank, a same row, and so forth of the memory 122, thereby reducing page conflicts that may arise when accessing the protection data 126.

In some instances, pages of the memory 122 that are allocated for the bitmap 130 may be contiguous. For example, and as illustrated in FIG. 2, page 212 and page 214 may be allocated for storage of the bitmap 130. As illustrated, page 212 and page 214 are adjacent to one another and, as such, are contiguous.

Amounts of the memory 122 that are allocated for storing the application data 124, the protection data 126, and the bitmap 130 may depend on a size of the memory 122 and a selected granularity of fragmentation. As an example, if the memory 122 corresponds to a 4 Gigabyte (GB) memory and a 4 Kilobyte (KB) page size is selected for an allocation granularity, then if one bit corresponds to each available, fragmented page (e.g., one bit per each 4 KB page within the available 4 GB memory) may be allocated for the bitmap 130 (e.g., an amount of 1 MB contiguous memory from the available 4 GB can be allocated for storing the bitmap 130). Of the remaining available 4 GB of memory, and as requests are received, any amount of fragmented memory may be allocated for storing the application data 124 or the protection data 126 for an application targeted for protection. An amount of fragmented memory may also be allocated for application data of other applications not targeted for protection. No particular large contiguous region needs to be reserved.

In accordance with the illustrations and description of FIG. 2, fragmentation of pages allocated to storing the application data 124 and the protection data 126 may reduce memory overhead by decreasing amounts of the memory 122 the computing device 102 consumes while performing memory protection data operations. Using example fragmentation techniques as described above, enabling memory data protection (e.g., ECC protection) may allocate 1 MB of the memory 122 for the bitmap 130 and 0.03 MB of the memory 122 for the protection data 126 (e.g., slightly more than 1 MB of the memory 122). In contrast, other techniques that proportionally allocate memory for memory protection data based on a size of the memory 122 may allocate 128 MB of the memory 122 for the protection data.

Techniques described by the FIG. 2, in general, reduce memory overhead by decreasing amounts of the protection data 126 that the computing device consumes while performing memory protection data operations. Furthermore, and in general, co-locating the application data 124 and the protection data 126 in respective pages (e.g., in respective channels, banks, or rows) may reduce memory transactions within the computing device 102, leading to further reductions in memory overhead.

Figure 3:
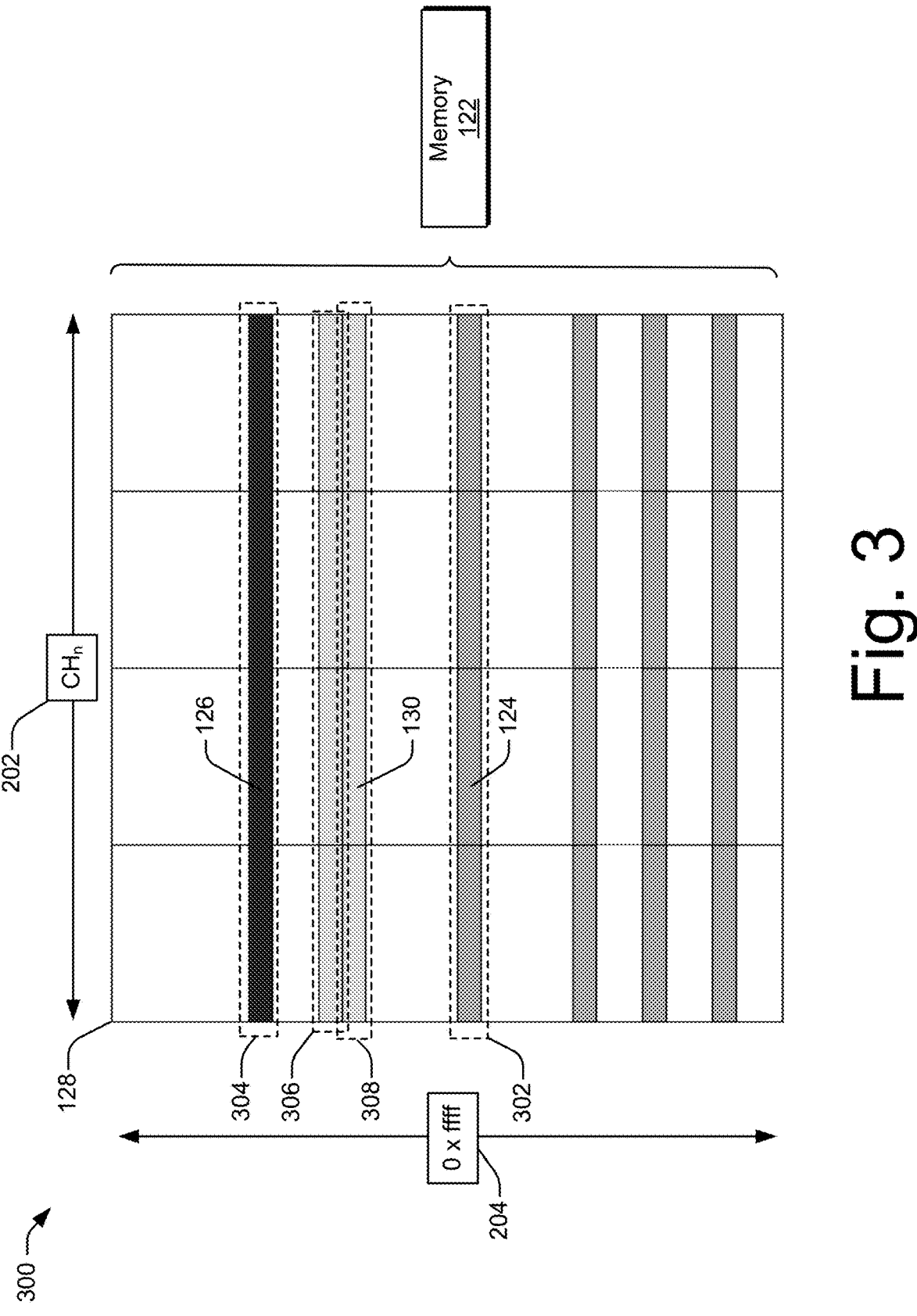
FIG. 3 illustrates other example details of a physical address space that represents a memory in accordance with one or more other aspects.

FIG. 3 illustrates other example details 300 of a physical address space in accordance with one or more other aspects. The physical address space may correspond to the physical address space 128 that represents the memory 122 of FIG. 1. FIG. 3 also illustrates an instance where the application data 124 and the protection data 126 may be separated (e.g., using "separated mapping") across one or more pages that are fragmented within memory 122. In accordance with the example details 300 of FIG. 3, memory protection data techniques may use less of the memory 122, effectuating a reduction in memory overhead, and avoid necessitating changes to an operating system's memory management procedures.

In general, as previously described in FIG. 2, an architecture of the memory 122 may include one or more channel (s) 202. Furthermore, a page within the memory 122 may be identified using a physical address 204 of the physical address space 128. Elements of the computing device 102 of FIG. 1 (e.g., elements of the CRM 104 and the hardware 106) may allocate pages of the memory 122 to store memory protection data (e.g., the application data 124 and/or the protection data 126) in accordance with the physical address space 128. Memory protection data techniques, as described below, may reduce overhead by decreasing memory consumption within the computing device 102.

As illustrated in FIG. 3, memory protection data techniques may use pages that are fragmented (e.g., not contiguous) within the memory 122. For example, and as illustrated in FIG. 3, page 302 and page 304 are separated and not contiguous. Accordingly, an operating system can efficiently manage multiple memory allocations from various applications.

However, in contrast to memory protection data techniques described in previous FIG. 2, the pages 302 and 304 do not co-locate the application data and the protection data within a page. For instance, page 302 accommodates the application data 124 but does not accommodate the protection data 126. Conversely, page 304 accommodates the protection data 126 but does not accommodate the application data 124. In general, while pages accommodating the memory protection data are fragmented, there is no co-locating the application data 124 and the protection data 126 within a page in these implementations.

The memory protection data techniques of FIG. 3 may also use pages that are contiguous within the memory. For example, pages 306 and 308, which accommodate the bitmap 130, are contiguous.

Similar to previously described FIG. 2, amounts of the memory 122 in FIG. 3 that are allocated for the bitmap 130 may depend on a size of the memory 122 and a selected granularity of fragmentation. As an example, if the memory 122 corresponds to a 4 Gigabyte (GB) memory and fragmentation is based on a selected 4 Kilobyte (KB) granularity (e.g., fragmented page size), one bit for each available, fragmented page (e.g., one bit per each 4 KB page within the available 4 GB memory) may be allocated for the bitmap 130 (e.g., an amount of 1 MB from the available 4 GB would be allocated for the bitmap 130). Of the remaining available memory, any amount of fragmented memory may be allocated for storing the application data 124 or the protection data 126 for various applications that require protection (as well as storing the application data 124 of other applications for which memory data protection is not desired) as application requests are received. No particular large contiguous region needs to be reserved.

In accordance with the illustrations and description of FIG. 3, fragmentation of pages allocated to storing the application data 124 and the protection data 126 may reduce memory overhead by decreasing amounts of the memory 122 the computing device 102 consumes while performing memory protection data operations. Although not so depicted in FIG. 2 or FIG. 3, some computing device implementations may include features of both. Thus, a computing device may include some memory allocations that co-locate application data 124 and protection data 126 and other memory allocations that separate application data 124 and protection data 126 into different pages, channels, banks, or rows.

Figure 4:
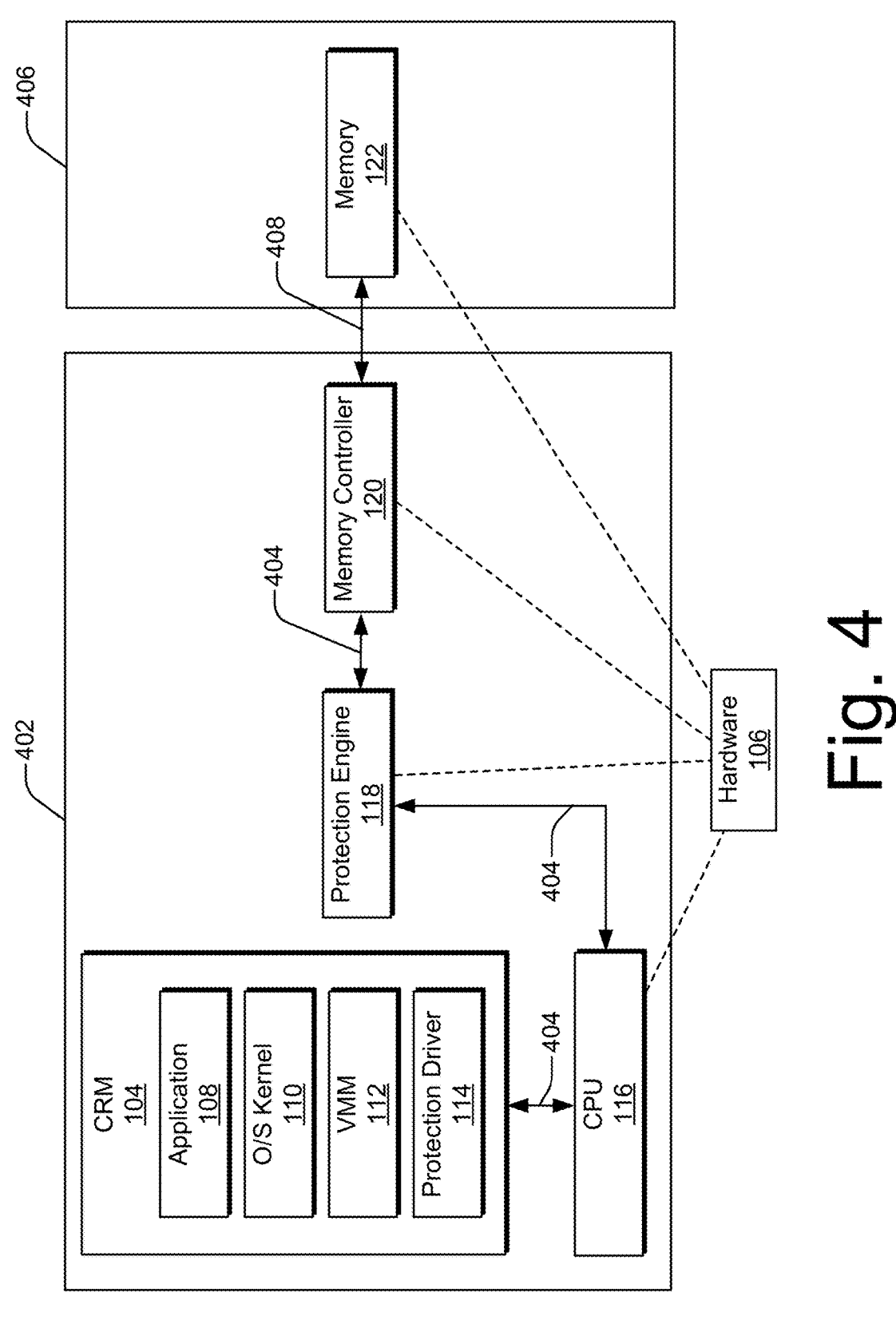
FIG. 4 illustrates an example system architecture that may use memory protection data in accordance with one or more aspects.

FIG. 4 illustrates an example system architecture 400 that may perform techniques using memory protection data. The system architecture 400 may be an architecture that uses elements of the CRM 104 and the hardware 106 of FIG. 1.

The system architecture 400 of FIG. 4 may include an SoC IC device 402. The SoC IC device 402 may be formed with logic integrated circuitry and memory integrated circuitry that performs one or more functions of the hardware 106 (e.g., may execute logic of the CPU 116, the protection engine 118, and/or the memory controller 120) and/or stores data with the CRM 104 (e.g., store the application 108, the O/S kernel 110, the VMM 112, and/or protection driver 114). As illustrated, one or more internal bus 404 may communicatively couple operative elements of the SoC IC device.

The system architecture 400 may also include a memory module 406. The memory module 406 may include memory integrated circuitry to perform one or more functions of the hardware 106 (e.g., store memory protection data in the memory 122). For example, the memory module 406 may include a dual in-line memory module (DIMM) populated with one or more components that include the memory 122, or the memory may be realized using package on package (PoP) low power double data rate (DDR) (LP-DDR) memory. As part of the system architecture 400, an external memory bus 408 (e.g., edge connectors, sockets, electrically conductive traces) may communicatively couple the memory 122 of the memory module 406 to the memory controller 120 of the SoC IC device 402.

In general, the system architecture 400 may support a variety of operations directed to using memory protection data. For instance, the system architecture 400 may support operations that include computing an amount of the memory 122 that is targeted for storing application data and protection data (e.g., the application data 124 and the protection data 126 of FIGS. 1-3), allocate pages of the memory 122 to provide the computed amount (e.g., one or more of the pages 206 and 208 of FIG. 2 or one or more of the pages 302 and 304 of FIG. 3), create a bitmap of the memory 122 (e.g., the bitmap 130 of FIGS. 1-3), and provision the bitmap to the protection engine 118.

Although the system architecture 400 includes the SoC IC device 402 and the memory module 406, many different arrangements of elements of the CRM 104 and the hardware 106 are possible. For instance, as opposed to an arrangement including the SoC IC device 402 and the memory module 406, elements of the CRM 104 and the hardware 106 may use a variety of combinations of discrete IC die and/or components, system-in-packages (SIPs), and so on which may be distributed across at least one printed circuit board (PCB), disposed in different portions of a server rack, and so forth.

Figure 5:
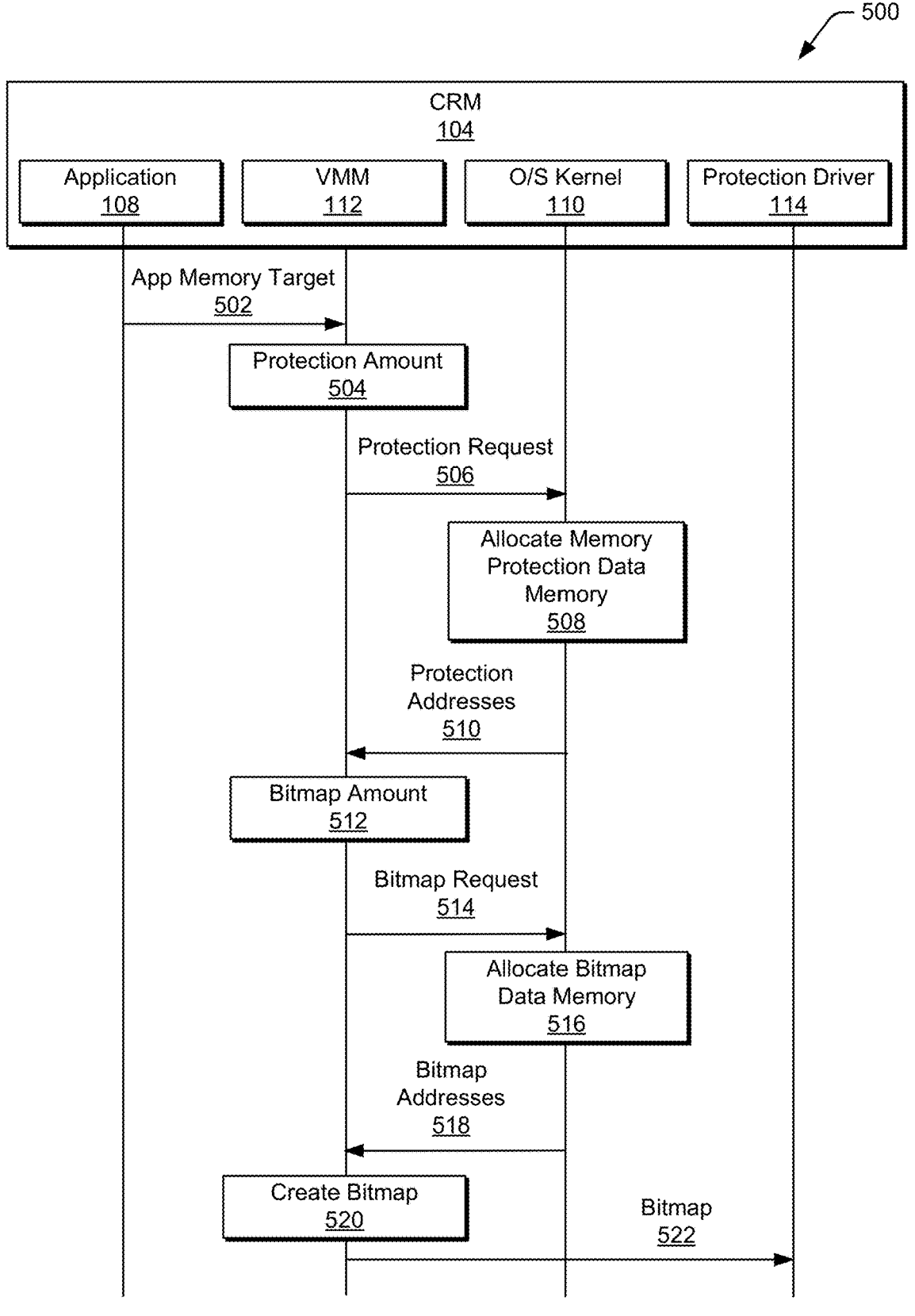
FIG. 5 illustrates example details of computations and messages that can be communicated within a computing device using memory protection data in accordance with one or more aspects.

FIG. 5 illustrates example details 500 of operations performed by and messages communicated within a computing device using memory protection data techniques in accordance with one or more aspects. A CPU of the computing device (e.g., the CPU 116 of the computing device 102 of FIG. 1) may effectuate the operations (e.g., computations) and transactions through execution of code of the modules stored in the CRM 104 of FIG. 1, including the application 108, the O/S kernel 110, the VMM 112, and/or the protection driver 114. For brevity, it is to be understood that in the following description of FIG. 5, reference to a module performing an operation or communicating a message corresponds to the computing device performing the operation or communicating the message as a result of the CPU executing instructions stored within the module.

At message 502, the application 108 communicates an application memory target to the VMM 112. The message 502, an application memory target message, may include parameters that indicate an amount of a memory targeted for application data (e.g., a first amount of the memory 122 that is targeted by the computing device to store the application data 124 of FIG. 1).

At operation 504, the VMM 112 determines an amount of the memory that is targeted to store protection data (e.g., computes a protection data amount) based on the requested application data. For example, parameters included in message 502 may indicate to the VMM 112 that the application data is to be protected. Upon determining that the application data is to be protected, the VMM 112 may compute additional memory that is targeted for protection data (e.g., a second amount of the memory 122 is targeted by the computing device to store the protection data 126 of FIG. 1). The VMM 112 may then sum the amounts (e.g., combine the first amount targeted for the application data 124 and the second amount targeted for the protection data 126) to determine a total amount of memory targeted (e.g., the computed memory protection data amount) for the computing device to store the memory protection data (e.g., store the application data 124 and the protection data 126).

At message 506, the VMM 112 communicates to the O/S kernel 110. The message 506, a protection request message, includes a request to the O/S kernel 110 to allocate the memory protection data amount.

At operation 508, the O/S kernel 110 allocates a first set of pages of the memory for the memory protection data. The allocation is effective to provide to the computing device, or to reserve within the computing device, the amount of the memory targeted for the computing device to store the memory protection data. As part of allocating the first set of pages of the memory, the O/S kernel 110 may create a listing of physical addresses (e.g., a listing of physical addresses 204 from the physical address space 128) corresponding to fragmented pages within the memory (e.g., one or more of the pages 206 and 208 of FIG. 2 or one or more of the pages 302 and 304 of FIG. 3).

At message 510, the O/S kernel 110 communicates to the VMM 112. The message 510, a protection addresses message, may include the listing of the physical addresses of the first set of pages allocated for the computing device to store the memory protection data.

At operation 512, the VMM 112 computes an amount of the memory to be reserved for a bitmap (e.g., a third amount of the memory 122 targeted for the bitmap 130 of FIGS. 1-3). The amount of the memory targeted for the bitmap may be dependent on a size of the memory 122 and a fragmentation granularity (e.g., a quantity of memory blocks, such as a number of available pages) within the memory. The amount of memory for the bitmap may also be based on a quantity of bits per memory block. For example, if more than two states (e.g., more than a protected state and a not protected state) or if additional information (e.g., a type or kind of protection) for a memory block is to be retained in the bitmap, each memory block may correspond to 2 bits, 5 bits, and so on of the bitmap. Each bit or each at least one bit can respectively correspond to a memory block of the memory.

At message 514, the VMM 112 communicates to the O/S kernel 110. The message 514, a bitmap request message, includes a request to the O/S kernel 110 to allocate the amount of memory targeted for the computing device to store the bitmap. In some instances, the bitmap request message may include a parameter that indicates the allocation is to be from a contiguous region of the memory instead of fragmented regions of the memory. A physically contiguous memory allocation can simplify operation of the memory controller 120 when accessing the bitmap 130.

At operation 516, the O/S kernel 110 allocates a second set of pages of the memory for the bitmap. The allocation is effective to provide to the computing device, or to reserve within the computing device, the amount of the memory targeted for the computing device to store the bitmap. As part of allocating the pages of the memory, the O/S kernel 110 may allocate a contiguous region of the memory (e.g., one or more of the pages 212 and 214 of FIG. 2 or one or more of the pages 306 and 308 of FIG. 3) based on the parameter being included in the bitmap request message.

At message 518, the O/S kernel 110 communicates to the VMM 112. The message 518, a bitmap addresses message, may include physical addresses of the second set of pages allocated for the computing device to store the bitmap.

At operation 520, the VMM 112 may create a bitmap (e.g., the bitmap 130). In creating the bitmap, the VMM 112 may associate one or more bit values to the physical addresses received through message 510 to indicate pages that are enabled to store the memory protection data. Unlike the application 108 which may use virtual addressing techniques, the VMM 112 may create the bitmap using the physical addresses to enable use by a memory controller (e.g., the memory controller 120 of FIG. 1), which can operate on physical memory addresses.

At message 522, the VMM 112 communicates with the protection driver 114. The message 522, a bitmap message, includes the bitmap or provides a reference to a bitmap. Communicating the bitmap to the protection driver 114 may enable the protection driver 114 to provision the bitmap and/or the physical addresses of the pages that are allocated for memory protection data to a protection engine (e.g., the protection engine 118 of FIG. 1). This may, in some instances, include writing the bitmap and/or the physical addresses to an on-chip cache of the protection engine. The protection engine may subsequently perform memory protection techniques that include transacting the memory protection data and executing one or more memory protection algorithms.

Although the example details 500 of FIG. 5 illustrates a combination of modules within the CRM of the computing device performing a series of operations (e.g., computations) and messaging exchanges in support of memory protection data techniques, the combination of modules and the series of operations may be performed in part, or in whole, using other combinations of modules and/or computing resources. In some instances, the other combinations of modules may not be part of the computing device (e.g., may be included in another CRM that is part of a server communicatively coupled to the computing device 102).

Example Methods

FIG. 6 illustrates an example method 600 using memory protection data techniques in accordance with one or more aspects. In some instances, the method 600 may be performed by a computing device using the aspects of FIGS. 1-5. The described operations may be performed with other operations, in alternative orders, in fully or partially overlapping manners, and so forth.

At operation 602, the computing device (e.g., the CPU 116 executing code of the O/S kernel 110 as illustrated in operation 508 of FIG. 5) allocates regions of a memory (e.g., the memory 122) for storing application data and protection data (e.g., the application data 124 and the protection data 126). In some instances, allocating the regions of the memory may include allocating pages that are fragmented within the memory (e.g., pages 206, 208, 302, or 304 of the memory 122). In other instances, allocating the regions of the memory may include allocating pages from a contiguous memory region (e.g., the pages 306 and 308 of the memory 122).

At operation 604, the computing device (e.g., CPU 116 executing code of the VMM 112 as illustrated in operation 520 of FIG. 5) creates a bitmap (e.g., the bitmap 130). The created bitmap includes a bit value that is indicative that a memory block includes at least one of the application data or the protection data. The memory block is included in at least one of the allocated regions (e.g., the memory block corresponds to, or is included in, page 206, 208, 302, or 304). The bitmap can include multiple bits having at least one bit value apiece. A given memory block of an allocated memory region respectively corresponds to at least one bit value of the multiple bits of the bitmap.

At operation 606, the computing device (e.g., the protection engine 118 executing a protection algorithm) protects the application data using the protection data. Protecting the application data includes operations that use the bit value of the bitmap to indicate that the memory block (e.g., of the at least one allocated region) includes at least one of the application data or the protection data. In some cases, like if the application data and the protection data are co-located, the memory block may include both the application data and the protection data.

In some instances, the method 600 may further include storing the application data and the protection data by locating the application data and the protection data within separate regions of the allocated regions (e.g., locating the application data 124 in the page 302 and the protection data 126 in the page 304, as illustrated in FIG. 3). The separate regions may be fragmented regions of the memory (e.g., the page 302 and the page 304 are fragmented pages that are separated by one or more pages allocated to at least one other application).

In the instances in which the application data and the protection data are located within separate regions, a physical address of a first region including the protection data (e.g., a physical address 204 of the page 304 including the protection data 126) may be determinable using one or more offsets from a physical address of a second region including the application data (e.g., a physical address 204 of the page 302 including the application data 124). Such offsets may be fixed, determinable based on size of the allocated regions, a size ratio of the protection data 126 to the application data 124 (e.g., 2 bytes of the protection data 126 for every 64 bytes of the application data 124), and so on.

In other instances, the method 600 may further include storing the application data and the protection data by co-locating the application data and the protection data within the at least one allocated region that may be a fragmented region of the memory (e.g., co-locating the application data 124 and the protection data 126 within the page 206 as illustrated in FIG. 2). The one allocated region may be a fragmented region of the memory (e.g., a memory block like the page 206, which is a fragmented page).

In the instances in which the application data and the protection data are co-located, co-locating the application data and the protection data may include interleaving the application data and the protection data across multiple memory blocks and/or channels (e.g., the channel(s) 202) of the memory, including across respective banks or memory rows thereof.

In general, and for the aforementioned example variations of the method 600, protecting the application data may include executing (e.g., the protection engine 118 executing) one or more algorithms that use the protection data and the application data. Examples of such algorithms include an error correction code (ECC) algorithm, an anti-rollback counter (ARC) algorithm, a data encryption algorithm, or a hashing algorithm.

The preceding discussion describes methods relating to using memory protection data to reduce memory overhead of a computing device. Aspects of these methods may be implemented in hardware (e.g., fixed logic circuitry), firmware, software, or any combination thereof. As an example, one or more operations described in method 600 may be performed by a computing device having one or more processors and a CRM. In such an instance, the processor in conjunction with the CRM may encompass fixed or hard-coded circuitry, finite-state machines, programmed logic, and so forth that perform the one or more operations.

Furthermore, these techniques may be realized using one or more of the entities or components shown in FIGS. 1-5, which may be further divided, combined, and so on. Thus, these figures illustrate some of the many possible systems or apparatuses capable of employing the described techniques. The entities and components of these figures generally represent software, firmware, hardware, whole or portions of devices or networks, or a combination thereof.

ADDITIONAL EXAMPLES

Example 1: A method performed by a computing device, the method comprising: allocating regions of a memory, at least one allocated region for storing application data and protection data; creating a bitmap including a bit value indicative that a memory block includes at least one of the application data or the protection data, the at least one allocated region including the memory block; and protecting the application data with the protection data, including using the bit value of the bitmap to indicate that the memory block includes at least one of the application data or the protection data.

Example 2: The method as recited by example 1, further comprising storing the application data and the protection data by locating the application data and the protection data within separate regions of the allocated regions, the separate regions comprising fragmented regions of the memory.

Example 3: The method as recited by example 2, wherein a physical address of a first separate region including the protection data is determinable using one or more offsets based on a physical address of a second separate region including the application data.

Example 4: The method as recited by example 1, further comprising storing the application data and the protection data by co-locating the application data and the protection data within an allocated region.

Example 5: The method as recited by example 4, wherein co-locating the application data and the protection data within the allocated region comprises interleaving the application data and the protection data across multiple memory blocks.

Example 6: The method as recited by example 4, wherein co-locating the application data and the protection data within the allocated region comprises interleaving the application data and the protection data across multiple memory blocks.

Example 7: The method as recited by any one of examples 1-6, wherein the memory block corresponds to a page of the memory.

Example 8: The method as recited by any one of examples 1-7, wherein protecting the application data comprises executing at least one of an error correction code, ECC, algorithm, an anti-rollback counter, ARC, algorithm, a data encryption algorithm, or a hashing algorithm using the protection data and the application data.

Example 9: A computer-readable storage medium comprising computer-executable instructions that when executed by a computing device will cause the computing device to carry out a method according to any one of the preceding claims.

Example 10: A computing device comprising: one or more central processing units; and a computer-readable storage medium according to example 9.

Example 11: A computing device comprising: a memory; a central processing unit; a protection engine; and a computer-readable storage medium, the computer-readable storage medium storing one or more modules of executable code that, upon execution by the central processing unit, direct the computing device to perform operations that: compute an amount of the memory for storing application data and protection data; allocate one or more regions of the memory to provide the computed amount; create a bitmap of at least a portion of the memory, the bitmap including bit values indicative that one or more memory blocks of the allocated regions include at least one of the application data or the protection data; and provision the bitmap to the protection engine.

Example 12: The computing device as recited by example 11, wherein the protection engine includes logic that is configured to: receive a memory transaction command including a physical address, the physical address corresponding to a memory block within the allocated regions of the memory; determine that the memory block stores at least one of the application data or the protection data using the bitmap; and perform the memory transaction command with the memory block based on the determination.

Example 13: The computing device as recited by example 11 or 12, wherein the protection engine is configured to access the application data and/or the protection data stored in the memory through a memory controller.

Example 14: The computing device as recited by any one of examples 11-13, wherein one or more elements of hardware of the computing device are configured to manipulate addresses to combine the application data and the protection data into a same region.

Example 15: The computing device as recited by any one of examples 11-14, wherein the memory includes a double data rate random-access memory, DDR RAM.

Example 16: The computing device as recited by any one of examples 11-15, wherein the central processing unit, the protection engine, and the computer-readable storage medium storing the one or more modules of executable code are included on a system-on-chip, SoC, integrated circuit device.

Example 17: The computing device as recited by any one of examples 11-16, wherein the protection engine includes an on-chip cache configured to store at least a copy of the bitmap.

Although implementations with apparatuses and methods are described that enable memory protection data to be used in manners that reduce memory overhead of a computing device, the subject of the appended claims is not necessarily limited to the specific features or methods described. Rather, the specific features and methods are disclosed as example implementations for using memory protection data in manners to reduce memory overhead of a computing device.

What is claimed is:

1. A method performed by a computing device, the method comprising:

allocating first regions of a memory for storing application data and protection data or other application data without protection data;

allocating second regions of the memory for one or more bitmaps of bit values indicative of memory blocks within the first regions that store the application data and the protection data, the second regions of the memory separate from the first regions of the memory;

creating, in one of the second regions of the memory, a bitmap including a bit value indicative that a memory block within the first regions of the memory stores at least some of the application data and the protection data; and protecting the application data stored in the first regions of the memory with the protection data, including using the bit value of the bitmap indicative that the memory block within the first regions stores at least some of the application data and the protection data.

2. The method as recited by claim 1, further comprising storing the application data and the protection data by locating the application data and the protection data within separate regions of the first regions, the separate regions comprising fragmented regions of the first regions of the memory.

3. The method as recited by claim 2, wherein a physical address of a first separate region including the protection data is determinable using one or more offsets based on a physical address of a second separate region including the application data.

4. The method as recited by claim 1, further comprising storing the application data and the protection data by co-locating the application data and the protection data within one of the first regions of the memory.

5. The method as recited by claim 4, wherein co-locating the application data and the protection data within the first region comprises interleaving the application data and the protection data across multiple memory blocks of the first region of the memory.

6. The method as recited by claim 4, wherein co-locating the application data and the protection data within the first region comprises interleaving the application data and the protection data across multiple channels of the memory.

7. The method as recited by claim 1, wherein the memory block corresponds to a page of the memory.

8. The method as recited by claim 1, wherein protecting the application data comprises executing at least one of an error correction code, (ECC) algorithm, an anti-rollback counter, (ARC) algorithm, a data encryption algorithm, or a hashing algorithm using the protection data and the application data.

9. A computing device comprising:

a memory;

a central processing unit;

a protection engine; and a computer-readable storage medium, the computer-readable storage medium storing one or more modules of executable code that, upon execution by the central processing unit, direct the computing device to perform operations that:

allocate first regions of the memory for storing application data and protection data or other application data without protection data;

allocate second regions of the memory for one or more bitmaps of bit values indicative of memory blocks within the first regions that store the application data and the protection data, the second regions of the memory separate from the first regions of the memory;

create, in one of the second regions of the memory, a bitmap of bit values indicative that one or more memory blocks within the first regions store at least some of the application data and the protection data; and provision the bitmap to the protection engine, the protection engine configured to protect the application data stored in the first regions with the protection data using the bit values of the bitmap in the second region of the memory.

10. The computing device as recited by claim 9, wherein the protection engine includes logic that is configured to:

receive a memory transaction command including a physical address, the physical address corresponding to a memory block within the first regions of the memory;

determine, based on the bit values of the bitmap, that the memory block stores some of the application data and the protection data or the other application data without protection data; and perform the memory transaction command with the memory block based on the determination.

11. The computing device as recited by claim 9, wherein the protection engine is configured to access the application data or the protection data stored in the first regions of the memory through a memory controller.

12. The computing device as recited by claim 9, wherein one or more elements of hardware of the computing device are configured to manipulate addresses to combine the application data and the protection data into a same region of the first regions of the memory.

13. The computing device as recited by claim 9, wherein the memory comprises a random-access memory (RAM) or a double data rate RAM (DRAM).

14. The computing device as recited by claim 9, wherein the central processing unit, the protection engine, and the computer-readable storage medium storing the one or more modules of executable code are embodied as a system-on-chip (SoC), an integrated circuit (IC), or an electronic device.

15. The computing device as recited by claim 9, wherein the protection engine includes an on-chip cache configured to store the bitmap or a copy of the bitmap.

16. A non-transitory computer-readable storage medium storing one or more modules of executable code that, upon execution by a central processing unit of a computing device, direct the computing device to implement operations comprising:

allocating first regions of a memory of the computing device for storing application data and protection data or other application data without protection data;

allocating second regions of the memory for one or more bitmaps of bit values indicative of memory blocks within the first regions that store the application data and the protection data, the second regions of the memory separate from the first regions of the memory;

creating, in the second regions of the memory, a bitmap including a bit value indicative that a memory block within the first regions of the memory stores at least some of the application data and the protection data; and protecting the application data stored in the first regions of the memory with the protection data, including using the bit value of the bitmap indicative that the memory block within the first regions store at least some of the application data and the protection data.

17. The non-transitory computer-readable storage medium as recited by claim 16, wherein the operations implemented by the computing device further comprise:

storing the application data and the protection data by locating the application data and the protection data within separate regions of the first regions, the separate regions comprising fragmented regions of the first regions of the memory.

18. The non-transitory computer-readable storage medium as recited by claim 17, wherein a physical address of a first separate region including the protection data is determinable using one or more offsets based on a physical address of a second separate region including the application data.

19. The non-transitory computer-readable storage medium as recited by claim 16, wherein the operations implemented by the computing device further comprise:

storing the application data and the protection data by co-locating the application data and the protection data within one of the first regions of the memory.

20. The non-transitory computer-readable storage medium as recited by claim 16, wherein co-locating the application data and the protection data within the first region comprises interleaving the application data and the protection data across multiple memory blocks of the first region of the memory.

* * * * *